3,410,929
RECOVERY OF PHYTATES FROM STEEPWATER
Willard E. Ledding, Clarendon Hills, and Ludwig K. Blatter, Berwyn, Ill., assignors to Corn Products Company, New York, N.Y., a corporation of Delaware
No Drawing. Filed June 8, 1965, Ser. No. 462,425
2 Claims. (Cl. 260—987)

This invention relates to an improved process for the recovery of phytic acid from corn steepwater.

In the past, phytic acid has been recovered from corn steepwater commercially by the addition of lime to precipitate calcium phytate from the steepwater and the calcium phytate is then removed by filtration. Although this process is relatively simple, there are a number of difficulties which have to be overcome. For example, the filtration rate is relatively slow and since the quantity of phytate present in steepwater is low, very large amounts of steepwater must be processed and very large filters must be used. Since rotary filters do not operate satisfactorily, filter presses are used, which results in high cost of both capital investment and labor requirements. To produce a reasonably pure grade of calcium phytate, free from protein, large quantities of wash water must be used and the calcium phytate filter must be reslurried in fresh water and refiltered. Numerous attempts have been made to precipitate the phytate in such a manner that it will filter more readily, but to date none of these attempts have been very successful.

It is an object of the present invention to provide a simple and economical process for the recovery of high purity calcium phytate from corn steepwater.

Steepwater is produced by soaking corn in warm water containing a small amount of sulfur dioxide and contains much of the soluble protein and minerals of the corn kernels.

In carrying out the process of our invention, corn steepwater is passed over an ion-retardation resin containing a mixture at the molecular level of weakly anionic and strongly cationic groups, which absorbs phytic acid. This resin adsorbs the phytic acid so strongly that it cannot be eluted by a simple water displacement normally used with this resin but must be eluted by a salt solution. It is this surprising strong preferential adsorption of phytic acid that makes it possible to use a water wash to remove the complex mixture of other ionic and nonionic materials present in the steepwater, so that when the phytic acid is thereafter eluted with a salt solution, a simple two-component solution is obtained from which a relatively pure phytate is easily recovered.

The following example is typical and informative only and is intended to illustrate the invention, but is not to be considered as limiting the invention in any manner:

EXAMPLE I

Eight liters of light steepwater (3.5 to 4.0° Bé.) was passed downflow over a resin column containing one liter of ion-retardation resin. (Dow Chemical Company Retardation 11 A8 made by polymerizing acrylic acid within the pores of Dowex Resin 1 which is a strong base resin.) The column was then rinsed with one liter of water to displace the steepwater from the resin. The adsorbed phytate was eluted by passing 2.5 liters of a 5 percent salt solution over the resin. The resin was then washed free of salt solution by passing 1.0 liter of water through the column. The resin column was then ready to repeat the foregoing operating procedures. The salt solution was brought to a pH of 5.2 with calcium hydroxide; a few grams of calcium chloride were added and the liquid heated to boiling. Calcium phytate precipitated from the salt solution and was readily recovered by filtration. Recovery of calcium phytate amounted to approximately 45 grams.

We claim:
1. A process for recovering phytic acid from corn steepwater which comprises passing the steepwater through a column filled with an ion retardation resin made by polymerizing acrylic acid within the pores of a strong based resin, washing the resin with water to displace the steepwater, and eluting the adsorbed phytic acid from the resin with a 5% sodium chloride salt solution, adding calcium hydroxide to precipitate calcium phytate and filtering the solution to recover calcium phytate.

2. A process for recovering phytic acid from corn steepwater which comprises passing the steepwater through a column filled with an ion retardation resin made by polymerizing acrylic acid within the pores of a strong based resin, washing the resin with water to displace the steepwater, and eluting the adsorbed phytic acid from the resin with a 5% sodium chloride salt solution.

No references cited.

CHARLES B. PARKER, *Primary Examiner.*

A. H. SUTTO, *Assistant Examiner.*